Patented Aug. 7, 1945

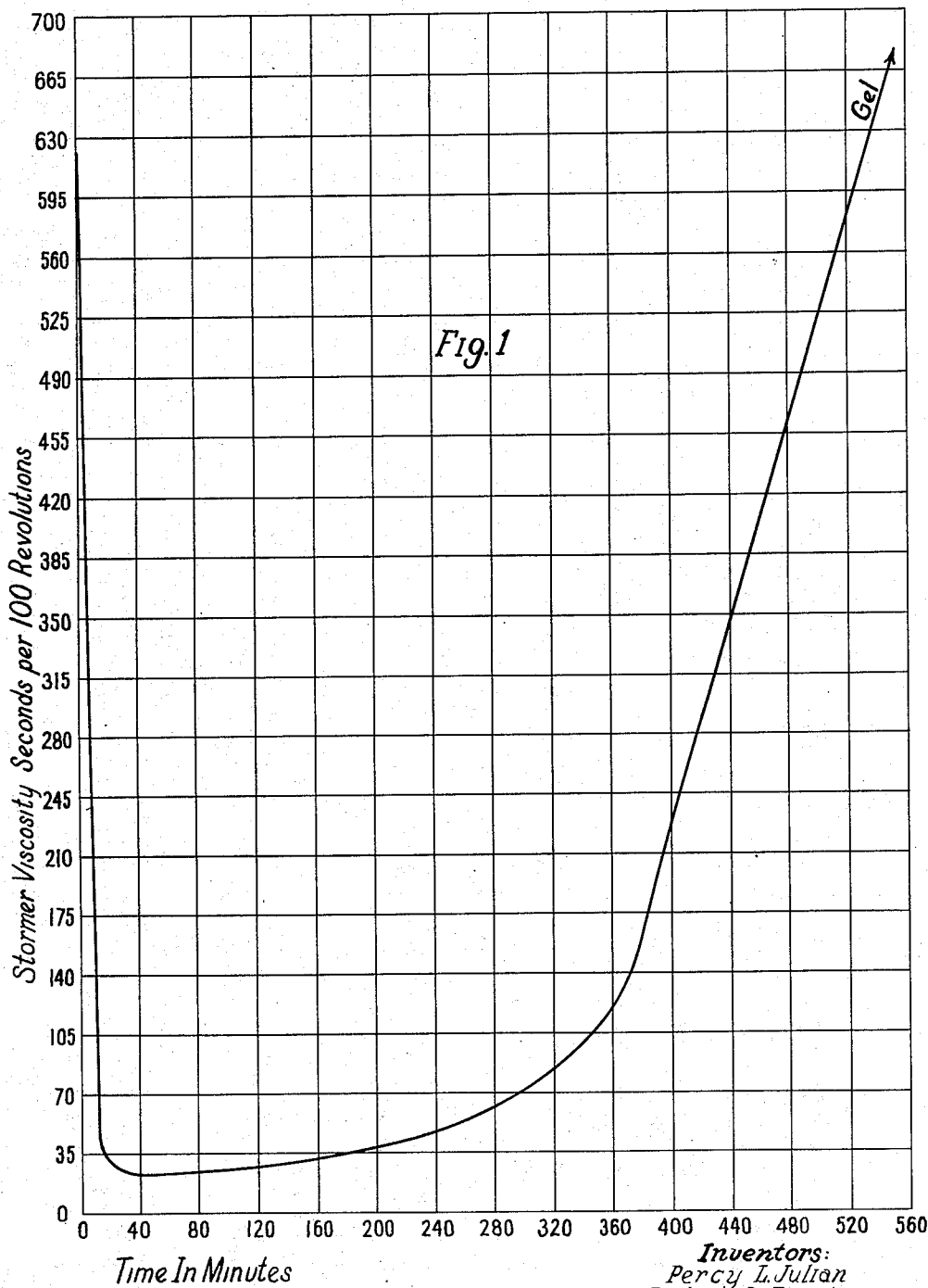

2,381,407

UNITED STATES PATENT OFFICE 2,381,407

PROTEIN COMPOSITION OF MATTER AND METHOD OF MAKING

Arthur A. Levinson, Chicago, Percy L. Julian, Maywood, and Andrew G. Engstrom, Itasca, Ill., assignors to The Glidden Company, Cleveland, Ohio, a corporation of Ohio Application July 31, 1940, Serial No. 348,780

9 Claims. (Cl. 260—112)

The present invention relates to the production of vegetable protein from proteinaceous oleaginous seed materials such as soybeans, peanuts, lupins, etc. or from any other source containing vegetable globulin protein. More specifically the invention relates to the production of vegetable protein products readily soluble in water and which, depending upon the particular mode of treatment have a variety of uses, as will more fully appear.

The single figure is a graph showing certain features of the invention.

Natural seed materials such as soybeans contain proteins of various types which may be broadly classified as follows:

(1) Water soluble proteins similar to albumin
(2) Globulin proteins soluble in aqueous acid, alkali and salt solutions
(3) Prolamines or proteins insoluble except at high concentrations of acid and alkali and certain organic solvents.

The seed material also contains in addition to the water soluble albumin other water soluble substances such as sugars, glucosides, gummy materials and colored ingredients as well as insoluble material such as fiber including cellulose and hemicellulose.

According to the present invention there is produced from the proteinaceous seed material or from other sources, particularly those containing globulin proteins, vegetable protein products which are readily soluble in water and which have many technical advantages over vegetable products heretofore produced. The vegetable protein products produced according to the present invention can be used for a variety of purposes such as foam retention and stabilizing agents in the preparation of icings, fillings, nougats, fondants and similar confections and food products, and in fact for any other use where foam retention and stability is desired; as textile sizings, etc. and for other purposes, depending in part at least upon the particular mode of treatment.

The protein product produced according to the present invention is a water soluble proteinate. It has been found that if the globulin protein is separated from the water soluble constituents, and preferably also from the insoluble ingredients of the seed material and the isolated globulin treated with a proteolytic enzyme that desirable advantages are obtained. Removal of water soluble constituents may be effected at any suitable stage in the process prior to the formation of the final proteinate. Thus, the seed material may be treated, leached or washed with water having an acidity such that the pH value corresponds substantially to that of the isoelectric point of the globulin protein. Under these conditions the water soluble constituents of the seed material are soluble but the globulin protein remains insoluble at its isoelectric point, or the globulin proteins still containing the water soluble constituents of the seed material may be treated at some subsequent stage in the process at the isoelectric point of the globulin and the water soluble constituents removed. Thus in the case of isolated protein the removal of the water soluble constituents may take place by precipitation of the isolated or extracted globulin at its isoelectric point and the curd filtered and washed to remove the water soluble constituents.

For example, the seed material such as soybean can be extracted with alkali, the extracted protein then precipitated by the addition of acid to the isoelectric point, the curd filtered and washed after which the final preparation of the alkali proteinate may take place. Or as an alternative procedure the seed material can be extracted with water, the insoluble material separated and sufficient acid added to precipitate the protein. The combination of these procedures may also be employed.

The enzyme hydrolysis is preferably effected by means of proteolytic enzymes, such as papain or other papainases, etc. The enzyme is also preferably one which is active in alkaline conditions as in such a case the enzyme hydrolysis may be effected in a solution of the final alkali proteinate. However, enzymes active under acid conditions may be employed and the alkali proteinate subsequently formed.

It has been found that if the protein which has been previously subjected to a substantial degree of hydrolysis, such as an alkaline hydrolysis, is subjected to a further hydrolysis by means of proteolytic enzymes that many desirable properties may be imparted to the alkali proteinate of the thus hydrolyzed proteins.

It has been observed that vegetable proteins such as the globulins of soybeans upon continued hydrolysis pass through a series of transformations from the sol to the gel stage, and that the viscosity curve has points of maxima and minima. Thus when soybean protein is subjected to an alkaline hydrolysis the viscosity will first rapidly increase to a point of maxima or gel stage, which increase in viscosity is separate and distinct from mere solution viscosity. Thereafter the viscosity drops more slowly. If now the protein is hydrolyzed with an enzyme, such as papain for example, the viscosity will continue to decrease to a point of minima, the time-viscosity curve of the enzyme treatment flattening out as the point of minima is approached. After passing the point of minima the viscosity then rises rapidly again to a point of maxima or gel stage.

If the subsequent enzyme hydrolysis be stopped before the second point of gelation occurs, preferably at or about the point of minimum viscosity, alkali proteinates of the thus formed protein upon whipping with water form a stiff, non-separating, light weight foam and the material can be used in place of egg albumin or egg white as a foam stabilizer in such confections as icings, fillings, nougats, fondants, etc. Upon whipping of the thus formed proteinate with water a surface gelatin occurs which it is believed is responsible for the foam stabilizing properties of the product.

In addition to use in confections the enzyme hydrolyzed material may be used for other purposes where foam stabilization is desirable and may be used in both edible and non-edible products. Also, in certain cases desirable products are produced by enzyme hydrolysis which do not show foam stabilizing properties but which none the less have very desirable properties. Also, it is not essential that the enzyme hydrolysis be preceded by some other hydrolyses but the enzyme hydrolysis is slower in such cases than if the protein is first hydrolyzed by some other method such as by acids or alkalies.

Example 1

One part of soybean meal was extracted with 15 parts of water and the insoluble material separated from the water extract. Sufficient acid was then added to bring the pH down to 4.6 and the liquid containing the water soluble constituents of the meal was separated from the precipitate. The precipitate was then washed with water at a pH of 4.6 and the volume brought back to the original with water. 3% sodium hydroxide and 3% lime based on the weight of the original flakes was added and the alkaline liquor thus formed was digested at 110° F. for 12 hours after which the protein was precipitated by the addition of sufficient sulfuric acid to bring the pH down to approximately 4.6 after which the curd was dried.

One part of the thus prepared dried protein curd was dissolved in 3½ parts of water by means of 3½% of dry sodium hydroxide by heating to 130° F. for thirty minutes. 1½% of papain by weight of the protein dispersed in water was then added and the temperature brought up to 135 to 140° F. and the hydrolysis continued until the point of minimum viscosity was reached which occurred after 1½ hours of heating at which time 1½% of hydrogen peroxide was added to stop the action of the enzyme. The point of minimum viscosity was determined by first hydrolyzing a small sample of the protein and plotting the time-viscosity curve to the point of gelation, the time being noted in which the minimum viscosity was obtained. The hydrogen peroxide was then added at the expiration of the predetermined elapsed time.

The solution thus formed was then dried on a drum dryer and the alkali proteinate thus formed ground to a suitable particle size. The product thus formed was readily soluble in water and when so dissolved in water could be whipped to form a stiff, light weight, non-separating permanent foam comparable in all respects to that produced from egg white or egg albumin. In place of drying the product the solution of the enzyme hydrolyzed alkali proteinate can be used directly if feasible to do so or a solution may be further concentrated without complete drying.

Also in place of treating the dried curd the enzyme and alkali may be added to the wet curd which contains approximately 80% moisture and 20% protein and the mixture heated. In such a case the mixture, at first pasty, immediately begins to get thinner and in a short time has a watery consistency. If too much water is present in the filtered and washed curd the curd may also be pressed to remove as much of the water as possible in which case a more concentrated solution is formed. Also in place of treating the curd or dried protein the enzyme may be added directly to the alkaline liquor after first adjusting the pH to the proper value for enzyme activity.

Example 2

250 parts of alkaline hydrolyzed soybean protein prepared in the same manner as set forth in Example 1 was slurred with water at 115–120° F. 50 parts of borax dissolved in 75 parts of water at 115–120° F. was then added in increments with agitation, and the agitation continued until the protein was dissolved. 2.5 parts of a proteolytic enzyme having an E. E. value of 3500 on casein at pH 8.2 to 8.5 was then added, the ratio of water to protein being brought up to 3.5:1. The digestion was continued for one hour, the temperature being maintained at 115–120° F. throughout. At the end of one hour the solution was pumped from the reaction vessel to a storage tank for a drum drier and the material dried on a drum drier.

The alkali protein thus formed does not possess the foam stabilizing property to the extent of that produced according to Example 1 but may be used as a substitute for gelatin in coating synthetic fibers such as cellulose acetate, and for other purposes.

Example 3

An isolated soybean protein was dissolved in four parts of water to one of protein employing 3½% sodium hydroxide by weight of the protein. The solution was made at 140° F. for 30 minutes at which time 1½% papain by weight of the protein was added. The temperature was maintained at 138° F. throughout the course of the papain action. Stormer viscosities were run at 138° F. using a 25 gram weight. The viscosities at the expiration of various time intervals are shown in Table 1 and are plotted in Figure 1.

*Table 1*

| Time in minutes of papain action | Stormer viscosities 138° F.—25 gram wt. |
|---|---|
| 0 | 620.0 |
| 12 | 39.8 |
| 24 | 26.8 |
| 32 | 25.8 |
| 47 | 25.7 |
| 62 | 24.8 |
| 77 | 26.2 |
| 96 | 27.6 |
| 162 | 32.8 |
| 187 | 37.8 |
| 207 | 28.2 |
| 242 | 47.2 |
| 277 | 63.0 |
| 312 | 82.8 |
| 342 | 104.0 |
| 372 | 147.0 |
| 417 | 296.0 |
| 462 | 385.0 |
| 482 | 478.0 |
| 502 | 525.0 |
| 540 | 640.0 |
| 1,415 | Gel |

When the dried alkali proteinate is produced it is not necessary that drying be effected by heating on a drum drier. Various other methods for drying may be employed such as spray drying, vacuum drying, etc. In fact almost any method of drying may be employed which does not bring about a neutralization of the alkali in the proteinate. It has been found, however, that the solutions of the proteins of the present invention have an advantage over such proteins as casein in that the viscosities are sufficiently low to enable their being pumped and can be readily handled on a drum drier, spray drier, etc. Solutions of casein cannot be so handled, except at low concentrations due to the high viscosity of the solutions. On the other hand when casein is treated with such enzymes as papain a separation of the casein solution into two phases occurs, the material separating being of a very viscous stringy character with a supernatent liquid above it.

As previously mentioned the enzyme hydrolysis is preferably preceded by some other hydrolysis which may be effected in various ways such as by acids, alkalis, etc. or by combinations thereof. Thus either acid or alkaline hydrolysis of the globulin proteins may be effected by digesting the globulin in either acid or alkaline dispersions or solutions. Heating and digesting at the isoelectric point as well as at lower pH values results in hydrolysis. However, as previously pointed out the hydrolysis should be such that the protein character is not substantially destroyed. The preliminary hydrolysis may, however, be eliminated and only an enzyme hydrolysis employed if desired.

Having described the invention what is claimed and desired to secure by Letters Patent of the United States is:

1. A water soluble composition of matter consisting essentially of an enzyme hydrolyzed alkali metal globulinate in dry form.

2. A water soluble composition of matter comprising an alkaline and enzyme hydrolyzed alkali metal globulinate in dry form.

3. A water soluble composition of matter comprising an alkaline and enzyme hydrolyzed alkali metal soybean globulinate in dry form.

4. The process which comprises hydrolyzing vegetable globulin protein with an enzyme, forming an alkali proteinate of said enzyme hydrolyzed globulin protein and recovering the same in dry form.

5. The process which comprises hydrolyzing soybean globulin protein with an enzyme, forming an alkali proteinate of said enzyme hydrolyzed globulin protein and recovering the same in dry form.

6. The process which comprises subjecting an isolated soybean globulin protein first to an alkaline hydrolysis, and then to a papain hydrolysis in an aqueous alkaline solution until approximately a point just short of that at which a rapid increase in viscosity and gelation commences is reached, and recovering the product in dry form.

7. The process which comprises first hydrolyzing soybean globulin protein by means of an alkali to a point beyond that at which a maximum viscosity is produced and at which the viscosity has been reduced from that of the maximum, continuing the hydrolysis by means of a papainase until approximately a point just short of that at which a rapid increase in viscosity and gelation commences is reached, forming an alkali metal proteinate of the thus treated protein and recovering the same in dry form.

8. The process which comprises subjecting an isolated soybean globulin protein to a papain hydrolysis for a period of time between that substantially necessary to reach a point of minimum viscosity and that at which a rapid increase in viscosity and gelation commences, forming an alkali metal proteinate of the thus treated protein and recovering the same in dry form.

9. The process which comprises subjecting an isolated soybean globulin protein first to an alkaline hydrolysis and then to a papain hydrolysis for a period of time between that substantially necessary to reach a point of minimum viscosity and that at which a rapid increase in viscosity and gelation commences, forming an alkali metal proteinate of the thus treated protein and recovering the same in dry form.

ARTHUR A. LEVINSON.
PERCY L. JULIAN.
ANDREW G. ENGSTROM.